(12) United States Patent
Brink et al.

(10) Patent No.: US 6,576,715 B2
(45) Date of Patent: Jun. 10, 2003

(54) PROCESS FOR THE PRODUCTION OF POLYAMIDE MOULDED PARTS WITH IMPROVED CRYSTALLIZATION BEHAVIOR

(75) Inventors: Ted. Brink, Maasticht (NL); Chi Sham, Singapore (SG); Jacob L. Cohen, Meerssen (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/792,065

(22) Filed: Feb. 26, 2001

(65) Prior Publication Data

US 2002/0007021 A1 Jan. 17, 2002

Related U.S. Application Data

(63) Continuation of application No. 09/323,405, filed on Jun. 1, 1999, now abandoned, which is a continuation of application No. PCT/NL97/00657, filed on Dec. 1, 1997.

(30) Foreign Application Priority Data

Dec. 2, 1996 (BE) .............................................. 9601001

(51) Int. Cl.⁷ .............................................. C08L 77/06
(52) U.S. Cl. ....................................................... 525/432
(58) Field of Search .......................................... 525/432

(56) References Cited

FOREIGN PATENT DOCUMENTS

| JP | 58158224 | * | 9/1983 |
| JP | 58201844 | * | 11/1983 |
| JP | 01154716 | * | 6/1989 |

* cited by examiner

*Primary Examiner*—Ana Woodward
(74) *Attorney, Agent, or Firm*—Pillsbury Winthrop LLP

(57) ABSTRACT

The invention relates to a process for the production of a polyamide molded part from a polyamide composition comprising 0.01–5 wt. % polyamide-4.6 and 99.99-95 wt. % of a polyamide with a melting point that is lower than that of polyamide-4.6. The polyamide composition is obtained by mixing in the melt of a blend of granules of the polyamide with the low melting point (A) and a composition (B) of the polyamide-4.6 in the polyamide with the low melting point, the polyamide-4.6 content of (B) amounting to 2–50 wt. % and B having been obtained at a temperature above the melting point of polyamide-4.6.

The polyamide with a low melting point is preferably polyamide-6. The process results in a permanent 15° C. increase in the crystallisation onset temperature of nylon-6. A 30% gain in cycle time relative to polyamide-6 nucleated with the aid of microtalc was realised for injection-molding of relatively large articles.

15 Claims, No Drawings

PROCESS FOR THE PRODUCTION OF POLYAMIDE MOULDED PARTS WITH IMPROVED CRYSTALLIZATION BEHAVIOR

This is a continuation of: National Appln. Ser. No. 09/323,405 filed Jun. 1, 1999, now abandoned which is itself a continuation of International Appln. No. PCT/NL97/00657 filed Dec. 1, 1997 which designated the U.S., and that International Application was published under PCT Article 21(2) in English.

The invention relates to a process for the production of a polyamide shaped article by means of moulding from the melt. The polyamide's crystallisation behaviour plays a very important part in moulding from the melt by means of, among other methods, injection-moulding, extrusion and spinning. For economic reasons in particular, the crystallisation rate and the crystallisation initiation are important in this context. For this reason nucleating agents are added to most polyamide compositions. Usually very finely distributed inorganic substances are used for this purpose. The most frequently used inorganic nucleating agents are microtalc and silica. The use of these nucleating agents however imposes very high demands on their good dispersion in the polyamide. Organic compounds also find application in some commercially available polyamide compositions for injection-moulding applications, in particular in PA-6.6 compositions, in which Na-phenylphosphinate is used. Polymers can also be used as nucleating agents, providing their melting points lie above that of the polyamide composition. JP-A-58201844 for example discloses the use of polyamide-4.6 as a nucleating agent for polyamide-6 or -6.6. The polyamide-6 or -6.6 composition containing 0–5 wt. % of a polyamide-4.6 powder with a particle size of less than 100 μm is to this end heated to a temperature above the melting temperature of PA-4.6 and subsequently spun or processed by means of injection-moulding. This process results in an increase in the crystallisation temperature of about 5–10° C., depending on the concentration of polyamide-4.6 used. A serious objection to this process is that the moulded parts obtained have a very high content of visible inhomogeneities, which is disadvantageous for the mechanical and optical properties and which for example makes their use for the production of film rather unattractive.

The inventors have attempted to meet all the objections to the processes mentioned above and to develop a process that can be carried out in a simple manner and that can be used for all techniques for moulding from the melt.

They have succeeded in this by first mixing the polyamide-4.6 into a minor amount of the polyamide with a lower melting point, at a temperature above the melting point of polyamide 4.6, and subsequently processing a mixture of the composition thus obtained and the major part of the polyamide with the lower melting point into the desired shaped article.

The process according to the invention for the production of a polyamide shaped article from a polyamide composition, comprising 0.01–5 wt. % polyamide-4.6 and 99.99–95 wt. % of a polyamide with a melting point lower than that of polyamide-4.6, the wt. % being relative to the overall amount of polyamide, by means of moulding from the melt is characterised as further indicated in claim 1.

'Polyamide-4.6' is understood to be a polyamide in which at least 50% of the repeating units are tetramethylene adipamide units. Preferably at least 75%, even more preferably at least 90%, of the repeating units are tetramethylene adipamide units. Polyamide-4.6 can be obtained through polycondensation of tetramethylene diamine and adipic acid or its adduct, optionally in the presence of other polyamide-forming monomers, for example E-caprolactam, a different diamine, for example hexamethylene diamine, or a different carboxylic acid, for example isophthalic acid or cyclohexane dicarboxylic acid. Polyamide-4.6 and its preparation are described in, for example, the Encyclopaedia of Polymer Science and Engineering, Vol. 11, pp. 315 ff (1988), and in the works referred to therein. Polyamide 4.6 is commercially available under the tradename STANYL®, produced by DSM.

A 'polyamide with a lower melting point' is understood to comprise any homopolyamide, copolyamide or mixture of homopolyamides, mixture of a homopolyamide and a copolyamide or mixture of copolyamides having a melting point below the melting point of the polyamide 4.6 as defined above. Examples of these polyamides with a melting point lower than that of polyamide 4.6 are to be found for example in the aforementioned Encyclopaedia. Commercially available are for example polyamide-6, polyamide-11, polyamide-12, polyamide-6.6, the polyamide based on met-axylilene diamine and adipic acid, copolyamides based on caprolactam, hexamethylene diamine and aromatic dicarboxylic acid, or based on methylpentamethylene diamine, hexamethylene diamine and one or more dicarboxylic acids.

The polyamide composition (A+B) for the process of the invention contains at least 0.01 wt. %, preferably at least 0.1 wt. %, polyamide-4.6. A concentration of less than 0.01 wt. % has no appreciable effect. The polyamide-4.6 content is preferably less than 5 wt. % because at higher contents the risk of gel formation in the composition increases, and the effect of a further increase in the polyamide-4.6 concentration on the crystallisation behaviour is negligible.

The molecular weight of the polyamide with the low melting point in the composition (A+B) may vary within a wide range and is predominantly dependent on the type of moulded article and the moulding technique. For example, a higher molecular weight, for example an Mn of approx. 20,000, will preferably be used for extrusion, while for injection-moulding of thin-walled objects a lower molecular weight, Mn of approx. 13,000, will preferably be used.

The molecular weight of the polyamide-4.6 is also of minor importance. The crystallisation behaviour of a composition of polyamide-6 and polyamide-4.6 of a low molecular weight does virtually not differ from that of a composition with the same concentration of polyamide-4.6 of a high molecular weight. For practical reasons it is preferable for the polyamide with a low melting point in B to have a lower molecular weight than this polyamide in A.

In another form, which however in some circumstances is less preferably, the lower melting polyamide of composition B may be different from the lower melting polyamide A. The advantage is that with one kind of masterbatch the crystallisation behaviour of different polyamides can be influenced. However in such a case in general the fraction of B in (A+B) should be chosen as low as possible to avoid negative effects on the mechanical properties.

In the process according to the invention the composition is shaped from the melt using the usual techniques, such as injection-moulding, extrusion, melt spinning and rolling, under the usual conditions for the polyamide concerned. Moulded articles obtained using the process are for example film, fibre, extruded articles such as sheets, rods and tubes and injection-moulded articles.

A particular characteristic of the composition (A+B) according to the invention besides a higher temperature, at which the crystallisation starts already during cooling, is that the crystallisation takes place across a wide range of temperatures if the cooling takes place at a constant rate, as is the case for example in differential scanning calorimetry (DSC). This particular behaviour could be explained by the facts that, on the one hand, the presence of polyamide-4.6 accelerates the initiation of the crystallisation and, and on the other hand, the crystallisation rate as such is not increased. If polyamide-6 is the polyamide with the lower melting point, two peaks, at approx. 203 and approx. 194° C., can even be distinguished in the DSC scan, which could point to the occurrence of two crystallisation forms.

EXAMPLES

Preparation of Composition B

This took place in a Werner and Pfleiderer ZSK 30 twin-screw extruder with degassing under the following conditions:

| | |
|---|---|
| cylinder temperature increasing from | 240–310° C. |
| polymer outflow temperature | 315° C. |
| screw speed | 150 rpm |
| throughput | 10 kg/hour |
| torque | 72 Nm |
| pressure | 2 MPa |
| L/D of the extruder screw | 33 |

A dry blend of polyamide-6 and polyamide-4.6 was introduced via the hopper. The concentration and type of polyamide-4.6 were varied.

The melt that left the extruder was entirely transparent. This melt was cooled and chopped into granules. These granules were subsequently dried under a vacuum at 120° C. for 16 hours.

Preparation of Composition A+B

Composition A+B was prepared by dry blending of granules of polyamide A and granules of polyamide composition B in the required ratio.

Production of Films

Films with a thickness of 50 μm were produced with the aid of a Göttfert 30-mm extruder, L/D=20, using a 25-cm 'coat-hanger' die.

The processing conditions were:

| | |
|---|---|
| cylinder temperature | 260° C. |
| screw speed | 90 rpm |
| throughput | 9 kg/hour |
| temperature of cooling roll | 100° C. |
| production rate | 13.5 m/min. |

In Comparative Experiment A, according to JP-A-58201844, a powder of a polyamide-4.6/polyamide-6 (95/5 wt. %) copolyamide, melting temperature 285° C., was applied to polyamide-6 granules and subsequently processed into film. The powder particles passed through a 50-mesh filter (d50=80 μm). The conditions under which these compositions were processed into film were the same as those in the example described above, except for the cylinder temperature, which was 290° C.

In other comparative experiments, polyamide 6 without a nucleating agent, (B), and polyamide 6 containing 0.075 wt. % microtalc, (C), were processed.

Injection-moulding

Compositions B and A+B and the compositions of the comparative experiments were prepared in the same way as indicated above.

In order to determine the minimum cycle time, caps with a clamping rim, as shown in FIG. 1, were injection-moulded using an Engel 80 injection-moulding machine under the following conditions. The caps were ejected from the mould by five ejection pins having different diameters:

| | |
|---|---|
| cylinder temperature settings | 230–240–245–250° C. |
| mould temperature | 80° C. |
| screw speed | 225 rpm |
| holding pressure | 2 MPa |
| melt temperature | 248° C. | cooling time =minimum length of time without any deformation of the cap occurring at the locations of the narrowest ejection pins.

Fibre Spinning

Fibre was spun from (A+B) at a spinning temperature of 240° C. using a Fourné spinning test apparatus, at a winding rate of 550 m/min. The yarn dtex was 70/10 dtex. This yarn was subsequently stretched at 160° C. at a total draw ratio of 3.75 under maximum friction. The Young's modulus and the heat shrinkage of the yarn obtained by the process according to the invention (Example IX) and in the comparative experiment without nucleating agent (G) were compared. In a second comparative experiment (H), according to JP-A-58201844, the spinning temperature was set to 295° C., the other conditions were chosen to be the same. Polyamide 4.6 and polyamide 6 were in this experiment introduced into the spinning extruder as a powder/granulate blend.

Results

Films

TABLE 1

| Example | B 6/4.6 wt. % | A + B 6/4.6 wt. % | transparency % | number of pits and gels per m$^2$ | | | Tc onset ° C. | spherulite size [μm] |
|---|---|---|---|---|---|---|---|---|
| | | | | >300 μm | >450 μm | >600 μm | | |
| I | 90/10[1] | 99.9/0,10[2] | 86 | 109 | 23 | 7 | 206.3 | 1.7 |
| II | 90/10 | 99.75/0,25 | 86 | 140 | 28 | 8 | 207.3 | |
| III | 90/10 | 99.5/0,50 | 88 | 286 | 61 | 18 | 208.1 | 1.2 |

TABLE 1-continued

| Example | B 6/4.6 wt. % | A + B 6/4.6 wt. % | transparency % | number of pits and gels per m² >300 μm | >450 μm | >600 μm | Tc onset °C. | spherulite size [μm] |
|---|---|---|---|---|---|---|---|---|
| IV | 80/20 | 99,75/0,25 | 87 | 134 | 31 | 9 | 207.2 | |
| V | 80/20 | 99,5/0,50 | 87 | 202 | 53 | 15 | 206.9 | |
| VI | 80/20 | 99,0/1,00 | 87 | 268 | 43 | 14 | 207.4 | 1.1 |
| VII | 80/20[3] | 99,5/0,50 | 89 | 262 | 52 | 17 | 207.1 | |
| A | | 99,5/0,50 | 89 | 2544 | 365 | 38 | 206.7 | |
| B | | 100/0 | 83 | 151 | 133 | 9 | 189.8 | 5 |
| C | microtalc | 0,75 gew. %[4] | 86 | 36 | 8 | 4 | 194.8 | 1.5 |

[1] Polyamide 6 is AKULON ® F124 with $h_{rel}$ = 2.4 Polyamide 4.6 is STANYL ® KS 200 from DSM with $\eta_{rel}$ = 2.7
[2] Polyamide 6 matrix is after-condensed F 124 with $\eta_{rel}$ = approx. 3.52
[3] Polyamide 4.6 is STANYL ® KS 500, $\eta_{rel}$ = approx. 3.7
[4] AKULON ® F-132 E from DSM.

The mechanical properties of films 1–7 and Comparative Examples A–C did not differ significantly. The tensile properties in the direction of the film and perpendicular to it did not differ significantly either. The different morphology of films 1–7 apparently has no noticeable influence on the tensile properties.

Noteworthy is that the spherulite size can be reduced to very low values with the process according to the invention, even to lower values than with the currently used microtalc nucleating agent systems.

The number of pits and gels measured in the films with the aid of light scattering proves to be somewhat dependent on the concentration, and is probably attributable to irregularities in the preparation of composition B. The low values obtained in Comparative Example C are attributable to the scale on which the compositions (A+B) were prepared. No absolute significance should be attached to the quoted values; they serve only for comparison.

The film according to the state of the art as described in JP-A-58201844, Comparative Example A, shows an unacceptably high concentration of pits and gels and is also slightly discoloured.

The crystallisation onset temperature in the DSC measurement of the film according to the process of the invention is more than 10° C. higher than that of the films in which microtalc was used as a nucleating agent and even more than 15° C. higher than that of the films in which no nucleating agent was used.

This higher crystallisation onset temperature has a favourable effect on the problem of film adhering to the cooling roll, enabling higher production rates.

Injection-moulding

Example VIII was carried out using the composition of Example V, only with $\eta_{rel}$=2.20; Comparative Experiments D with a non-nucleated polyamide 6, Akulon® K 122 from DSM, $\eta_{rel}$=2.14, and E with polyamide 6 containing 0.1 wt. % microtalc as a nucleating agent, Akulon® K 222-D, $\eta_{rel}$=2.20.

The same concentration of release agent was applied to the polyamide granules before processing.

| | Composition A + B [wt. %] | minimum cycle time [sec.] |
|---|---|---|
| Example VIII | polyamide-6/ polyamide-4.6 99.5/0.5 | 15.7/ 12.5 |
| Comp. Ex. E | polyamide-6/ microtalc | 16.7/ 12.8 |
| Comp. Ex. D | polyamide-6 | 16.7/ 13.8 |

The figures in the first row of column 3 indicate the minimum cycle times required with the thin ejection pins, those in the second column those with the thick pins.

The observed differences, though small, are significant and indicate a shortening of the cycle time when the process according to the invention is used.

The relatively small differences in minimum cycle time observed in the model tests prove to result in differences in cycle time of about 30% in practice, in injection-moulding of thick-walled objects, such as connector housings for power current.

In a comparative experiment, F, the composition of Comparative Example A was injection-moulded at 295° C. The caps obtained were discoloured Fibres The properties of the yarns obtained in Example IX with composition (A+B) of Example V, and of Comparative Experiment G were compared. The most important difference is that the yarn obtained according to the process of the invention shows no heat shrinkage whereas that of Comp. Exp. G does. The modulus was also significantly higher. The other properties, e.g. tensile strength, were of the same order.

The fibre according to Comparative Experiment H showed properties corresponding to those according to Example IX, only the spinning process was disturbed by rapid pressure build-up before the spinning filters and by fibre rupture. Discolouration also occurred.

Example X and Comparative Example I

In the same way as in Example III a composition (A+B) containing 0.50 wt. % PA 4.6 and 99.5 wt. % PA 6 was prepared (Example X).

In a similar manner a composition (A+B)' was obtained which contained PA-6.6 instead of PA-4.6. The differential heat scan of the compositions was determined with the aid of differential scanning calorimetry. The scanning rate was 10° C./min. The temperature programme was as follows
(1) 40° C.→250° C., 4 minutes at 250° C. and subsequently from 250° C.→40° C.
(2) 40° C.→270° C., 4 minutes at 270° C. and subsequently from 270° C.→40° C.
(3) 40° C.→320° C., 4 minutes at 320° C. and subsequently from 320° C.→40° C.

The following crystallisation onset temperatures and crystallisation temperatures were found.

|   | PA 6/PA 6.6 (Comp. Example I) | | | PA-6/PA-4.6 (Example X) | | |
|---|---|---|---|---|---|---|
|   | $t_{cr.ons}$ | $t_{cr.1}$ | $t_{cr.2}$ | $t_{cr.ons}$ | $t_{cr.1}$ | $t_{cr.2}$ |
| 1 | 207 | 194 | 203 | 207 | 194 | 203 |
| 2 | 196 | 193.5 | — | 207 | 194 | 203 |
| 3 | 196 | 193.5 | — | 207 | 194 | 203 |

These experiments show that PA 4.6 very surprisingly retains its nucleating properties, even when it has melted completely, Exp. 1 and 2 vs. 3. PA-6.6 on the contrary looses its nucleating properties when composition (A+B)' is heated to above the melting point of the PA-6.6.

As the temperature at which PA-6.6 melts, 255° C., is very readily exceeded in the processing of PA-6, and in many cases in practice even lies below the recommended processing temperatures of PA-6, it is not advisable to use PA-6.6 as a nucleating agent for PA-6. PA-6.6 cannot be used as a nucleating agent for polyamides with higher melting points. PA-4.6 however presents a much wider processing range for PA-6 in the process according to the invention and can also be used in polyamides with a considerably higher melting point, such as copolyamides containing in their main chains repeating units derived from aromatic dicarboxylic acids.

What is claimed is:

1. A process for the production of a shaped article comprising:

melt blending polyamide-4.6 and a first polyamide, having a melting point below polyamide-4.6, at a temperature above the melting point of polyamide-4.6 to form a composition comprising, relative to the total weight of the composition, 2–50 wt. % polyamide-4.6;

forming a mixture by combining, relative to 100 parts by weight of said mixture, 5–50 parts by weight of said composition with 50–95 parts, relative to 100 parts by weight of the said mixture, of a second polyamide, having a melting point below polyamide-4.6; and molding said mixture at a temperature above the melting point of the melting point of said first or second polyamide.

2. A process according to claim 1, wherein the first and second polyamides are the same compound.

3. A film obtained by the process according to claim 2.

4. A fibre obtained by the process according to claim 2.

5. An injection-molded polyamide article obtained by the process according to claim 2.

6. An extruded polyamide article obtained by the process according to claim 2.

7. The process according to claim 1, wherein the second polyamide is polyamide-6, polyamide-6.6, polyamide-11 or polyamide-12.

8. A film obtained by the process according to claim 7.

9. A fiber obtained by the process according claim 7.

10. An injection-moulded polyamide article obtained by the process according to claim 7.

11. An extruded polyamide article obtained by the process according to claim 7.

12. A film obtained by the process according to claim 1.

13. A fiber obtained by the process according claim 1.

14. An injection-moulded polyamide article obtained by the process according to claim 1.

15. An extruded polyamide article obtained by the process according to claim 1.

* * * * *

UNITED STATES PATENT AND TRADEMARK OFFICE
CERTIFICATE OF CORRECTION

PATENT NO. : 6,576,715 B2
DATED : June 10, 2003
INVENTOR(S) : Brink et al.

It is certified that error appears in the above-identified patent and that said Letters Patent is hereby corrected as shown below:

Title page,
Item [56], References Cited, U.S. PATENT DOCUMENTS, please add the following:
-- 5,434,223    07/1995        Scheetz et al.
   5,414,051    05/1995        Mason et al. --
FOREIGN PATENT DOCUMENTS, please add the following:
-- 441 423      08/1991        EP
   01154716     06/1989        JP
   058158224    09/1983        JP --
OTHER PUBLICATIONS, please add the following reference:
-- Patent Abstracts of Japan, Vol. 008, No. 041, English abstract of JP 58 201844, filed Nov. 24, 1983. --

Signed and Sealed this

Seventh Day of October, 2003

JAMES E. ROGAN
*Director of the United States Patent and Trademark Office*